(12) United States Patent
Acharya et al.

(10) Patent No.: US 6,795,566 B2
(45) Date of Patent: Sep. 21, 2004

(54) METHOD OF INTEGRATING A WATERMARK INTO A COMPRESSED IMAGE

(75) Inventors: Tinku Acharya, Tempe, AZ (US); Kannan Raj, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/457,922

(22) Filed: Jun. 9, 2003

(65) Prior Publication Data

US 2003/0194109 A1 Oct. 16, 2003

Related U.S. Application Data

(63) Continuation of application No. 10/194,179, filed on Jul. 12, 2002, now Pat. No. 6,608,912, which is a continuation of application No. 09/519,135, filed on Mar. 6, 2000, now Pat. No. 6,449,380.

(51) Int. Cl.[7] ............................................... H04K 1/00
(52) U.S. Cl. ..................................... 382/100; 382/235
(58) Field of Search ............................... 382/100, 232, 382/235; 380/210, 252, 287, 54; 713/176; 370/527, 529

(56) References Cited

U.S. PATENT DOCUMENTS

| | | | |
|---|---|---|---|
| 5,499,294 A | 3/1996 | Friedman | 380/10 |
| 5,646,997 A | 7/1997 | Barton | 380/23 |
| 5,689,626 A | 11/1997 | Conley | 395/117 |
| 5,778,102 A | 7/1998 | Sandford, II et al. | 382/251 |
| 5,809,139 A | 9/1998 | Girod et al. | 380/5 |
| 6,192,139 B1 | 2/2001 | Tao | 382/100 |
| 6,208,735 B1 | 3/2001 | Cox et al. | 380/54 |
| 6,208,745 B1 | 3/2001 | Florencio et al. | 382/100 |
| 6,252,971 B1 | 6/2001 | Wang | 382/100 |
| 6,275,599 B1 | 8/2001 | Adler et al. | 382/100 |
| 6,285,775 B1 | 9/2001 | Wu et al. | 382/100 |
| 6,301,368 B1 | 10/2001 | Bolle et al. | 382/100 |
| 6,345,104 B1 | 2/2002 | Rhoads | 382/100 |
| 6,449,380 B1 * | 9/2002 | Acharya et al. | 382/100 |
| 6,608,912 B2 * | 8/2003 | Acharya et al. | 382/100 |

FOREIGN PATENT DOCUMENTS

| | | | |
|---|---|---|---|
| EP | 0 388 579 A2 | 9/1990 | G06F/15/72 |
| GB | 2 236 048 A | 12/1998 | H04N/1/32 |
| WO | WO 98/31152 A2 | 7/1998 | H04N/7/50 |

OTHER PUBLICATIONS

Hartung et al., "Watermaking of MPEG–2 Encoded Video without Decoding and Re–encodong", *Proc. SPIE vol. 3020: Multimedia Computing Newtorking*, 2/97, 264–274.

(List continued on next page.)

*Primary Examiner*—Andrew W. Johns
(74) *Attorney, Agent, or Firm*—Christopher K. Gagne

(57) ABSTRACT

In accordance with one embodiment of the invention, a method is provided for integrating at least a portion of a watermark into at least a portion of a compressed image. The method of this embodiment includes encoding at least a portion of the watermark and compressing at least a portion of the image. The encoded watermark, or portion thereof, and the compressed image, or portion thereof, are combined. Of course, many other embodiments in accordance with the invention are included within the scope of the present invention.

22 Claims, 3 Drawing Sheets

OTHER PUBLICATIONS

Langelaar et al., "Real–time Labeling Methods for MPEG Compressed Video", *Proc. 18th Symp. on Information Theory in the Benelux*, 597, pp 25–32.

Hartung et al., "Watermarking of Uncompresed and Compressed Video", *Signal Processing*, vol. 66, 5/98, pp 283–301.

Langelaar et al., "Real–time Labeling of MPEG-2 Compressed Video" *J. Visual Communications and Image Representation*, vol. 9, No. 4 12/98, pp 25–270.

Su et al., "Digital watermarking on EBCOT Compressed Images", *Proc. SPIe vol. 3808: Applications of Digital Processing XXII*, 7/99, 313–324.

Kiya et al., "A Method of Inserting Binary Data into MPEG Video in the Compressed Domain", *IEICE Trans. Fundamentals*vol.E82–A1 No. 8, 1999, pp 1485–1492.

Wong et al., "Data Hiding and Watermaking in JPEG Compressed Domain by DC Coefficient Modification", *Proc. SPIE vol. 3971: Security and Watermarking of Multimedia Contents II*, 1/00, pp 237–244.

Jing et al., "Robust Compress Video Watermarking" *Pro. SPIE vol. 3971: Security and Watermarking of Multimedia Contents II*, 1/00, pp 477–485.

* cited by examiner

C(F): | B0 | B1 | B2 | ... | BQ | BQ+1 | ... | Bn-1 | where each Bi is a Byte and the file C(F) consists of n Bytes

E(B): | N0 | N1 | N2 | ... | Ni | ... | Nm | where Ni is a byte and size of encrypted watermark E(B) is m+1 bytes

CE(F): | B0 | B1 | B2 | ... | BQ0 | N0 | BQ0+1 | ... | BQ1 | N1 | BQ1+1 | ... | BQm | Nm | BQm+1 | ... | Bn-1 |

FIG. 1

METHOD OF INTEGRATING A WATERMARK INTO A COMPRESSED IMAGE

RELATED APPLICATIONS

This patent application is a continuation of U.S. patent application Ser. No. 10/194,179, titled "Method of Integrating A Watermark Into A Compressed Image," filed Jul. 12, 2002, now U.S. Pat. No. 6,608,912, which, in turn, is a continuation of U.S. patent application Ser. No. 09/519,135, titled "Method of Integrating A Watermark Into A Compressed Image," filed Mar. 6, 2000, now U.S. Pat. No. 6,449,380. The subject patent application is also related to U.S. patent application Ser. No. 09/519,874, titled "Method of Integrating a Watermark into an Image," by Acharya et al., filed Mar. 6, 2000, assigned to the assignee of the current invention and herein incorporated by reference.

BACKGROUND

This disclosure is related to watermarking and, more particularly, to integrating or embedding a watermark into an image, such as a compressed digital image.

The management of information is becoming a more challenging problem with the progress of information technology, especially in the area of digital imaging. Identification of ownership and/or other rights with respect to an image when transmitted through a network, such as a public network, is receiving a great deal of attention. Furthermore, information management and the secure movement of image data are becoming complex tasks, particularly in light of the rapid evolution of a variety of technologies. "Digital Watermarking" may provide a potential solution to this problem.

BRIEF DESCRIPTION OF DRAWINGS

The subject matter regarded as the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

FIG. 1 is a schematic diagram illustrating one example application of an embodiment of a method of integrating a watermark into a compressed image in accordance with the present invention;

DETAILED DESCRIPTION

Figure 2:
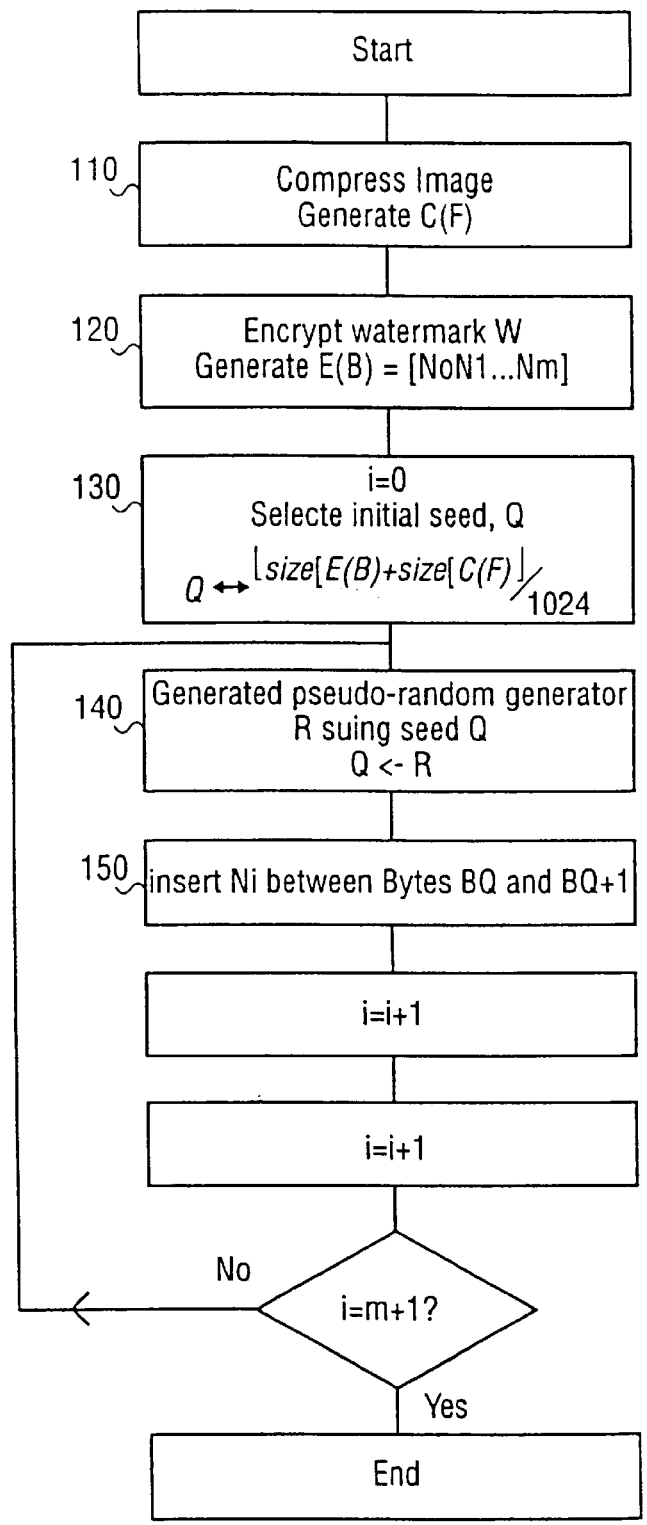
FIG. 2 is a flowchart illustrating one embodiment of a method of integrating a watermark into a compressed image in accordance with the present invention.

In the following detailed description, numerous specific details are set forth in order to provide a thorough understanding of embodiments of the invention. However, it will be understood by those skilled in the art that embodiments of the present invention may be practiced without these specific details. In other instances, well-known methods, procedures, components, and circuits have not been described in detail so as not to obscure embodiments of the present invention.

Some portions of the detailed description which follow are presented in terms of algorithms and symbolic representations of operations on data bits or binary digital signals within a computer memory. These algorithmic descriptions and representations are the techniques used by those skilled in the data processing arts to convey the substance of their work to others skilled in the art. An algorithm is here, and generally, is considered to be a self-consistent sequence of acts or operations leading to a desired result, and include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification, discussions utilizing terms such as "processing" or "computing" or calculating" or "determining" or the like, refer to the action and processes of a computer or computing system, or similar electronic computing device, that manipulate and transform data represented as physical, such as electronic quantities, within the computing system's registers and/or memories into other data similarly represented as physical quantities within the computing system's memories, registers or other such information storage, transmission, retrieval, or display devices.

Operations, such as image acquisition, encoding, manipulation, transmission, retrieval, or storage particularly involve careful handling of noise that may be present in one or more images and which may appear as perceptually disturbing artifacts. The impact of this may be reduced by reducing the impact at the source. However, this may not always be possible, and, furthermore, images that may be digitally captured may, at times, be left with remnants of noise, even after the application of noise reduction techniques. Techniques and processes are available to reduce the impact of spatial noise on still images and digital cameras and both spatial and high frequency noise in video image capture systems. However, another field of image representation is referred to as "Digital Watermarking," in which specific signal information may typically be encoded as "noise." A Digital Watermark may be a specially encoded symbol or signature placed in the image for the purpose of image authentication or verification or simply for encoding secret information in one or more images.

It would be desirable to have a process or technique for encoding Digital Watermarks that was unaffected, or at least substantially unaffected, by the process of image compression/decompression. One embodiment of a method of integrating a watermark into a compressed image in accordance with the present invention provides that capability.

Digital Watermarks, such as logos or signatures, may be introduced into the image in a variety of ways. As one example, although the invention is not limited in scope in this respect, the watermark itself may be, for example, a 32×32 image block of a logo or signature that may be encrypted or, alternatively, employed in the form provided. This watermark signal information, or a portion of the watermark, may be combined into the image, or a portion thereof, after the image or image portion has been compressed. This may be implemented by inserting the watermark pixel signal values between selected pixel values or between selected pixel locations using a suitable technique or process. Therefore, in this example, the signal information may be intermittently interspersed in the compressed image, or portion thereof. In particular, in one such embodiment, the watermark, or a portion thereof, may be encoded, the image, or a portion thereof, may be compressed, and the encoded watermark and the compressed image, or portions thereof, may then be combined in this manner, for example.

Typically, after an image is captured by an image capture device, such as an imager, for example, it undergoes image processing, followed usually by compression, before storage and/or transmission. To retrieve and display the image, a corresponding decompression process or technique is typically applied. Usually, feasible image compression/decompression processes or techniques are "lossy" in nature, that is, the pixel signal values of the decompressed image do not correspond precisely to the original image. If the Digital Watermark, in the form of pseudo-random noise, is encoded in the image, the compression and decompression typically will corrupt the encoded watermark signal information and, hence, the watermark will not be recoverable for identification and/or authentication to occur.

In one embodiment of a method of integrating a watermark into a compressed image in accordance with the present invention, therefore, encoded watermark signal information is integrated into a compressed image. Of course, as previously indicated, the watermark signal information may alternatively not be encoded. Furthermore, in one particular embodiment, some relevant signal information may also be provided in the header, although the invention is not limited in scope in this respect. The encoded watermark signal information, therefore, is combined in the compressed data of the compressed image, or a selected portion thereof, such as by intermittently interspersing the watermark signal information with the compressed image data. The watermark signal information may then be decoded from the compressed image either prior to decompression of the compressed image or, alternatively, during the decompression process, depending upon the particular integration methodology that may have been applied during integration of the watermark signal information with the compressed image. The decoded watermark signal information may then be blended with the decompressed image in a perceptually non-detectible or barely detectible manner, if desired, as described, for example, in the aforementioned concurrently filed patent application, although the invention is not limited in scope in this respect. For example, this may not be performed.

Encryption of watermark signal information may be done by encoding the information in the spatial domain or the transform domain. Image or spatial domain encoding may involve random scrambling of bits with an unscrambling key similar to what has been applied in 128-bit encryption for Internet applications and image transmission, for example. See, for example, "A method for obtaining digital signatures and public key cryptosystem," ACM Commun. 1978, Vol. 21, pp120–126; "Evaluation of selective encryption techniques for secure transmission of MPEG-compressed bit-streams," Alattar et al., Proc. ISCAS, pp 340–343. vol. 14, 1999; or "Combining data compression and encryption," C. Finnila, IEEE WESCON/94, pp 404–409, although, these are merely provided as examples. Alternately, transform domain encoding may be done in any one of a number of ways, such as with Fourier transform encoding, wavelet transform encoding, Walsh-Hadamard transform encoding, etc. It will, of course, be appreciated by one of ordinary skill in the art that these are just examples of image domain encoding and frequency domain encoding, and the invention is not limited in scope to any particular approach. Any one of a number of currently known or later to be developed approaches may be employed.

In one particular embodiment of a method for integrating a watermark into a compressed image, a process in accordance with the present invention may include the following. For an image stored as a file of pixel signal values, for example, the compressed image file may be represented as $C(F)$. Let B denote a 32×32 block representing the watermark signal information in this particular embodiment. Of course, the invention is not limited in scope to a watermark or watermark signal information of any particular size or shape. In this particular embodiment, watermark signal information B is encrypted. Let $E(B)$ represent the bit stream of the encrypted block B. In this particular embodiment $E(B)$ is divided into a series or sequence of groupings of bits, here 8 bit "bytes," which represent the watermark encoded signal values. For example, $$E(B)=N_0 N_1 N_2 N_3 \ldots N_m \qquad [1]$$

where each $N_i$ represents a byte in the encrypted block $E(B)$. Therefore, $E(B)$ is the binary digital signal representation or bits for the encrypted block. Of course, the invention is not restricted to dividing the watermark into bytes. For example, in an alternative embodiment, the watermark signal information may be divided into groupings of bits that comprise 4 bit nibbles instead. In this particular embodiment, the watermark signal information $E(B)$ may then be included or combined into the compressed file $C(F)$ using the approach described hereinafter.

Here, the bytes of the encrypted watermark block $E(B)$ are distributed over the compressed image file between selected byte locations in the compressed image. Likewise, in this particular embodiment, the byte locations are selected in accordance with a pseudo-random number generation technique. Any one of a number of pseudo-random number generation techniques may be employed, and the invention is not limited in scope to any particular process. However, in this particular embodiment, an initial "seed" of the pseudo-random process is selected substantially in accordance with the following relationship [2]:

$$Q \leftarrow \lfloor [\text{size}[E(B)] + \text{size}[C(F)]]/1024 \rfloor$$

where "size[ ]" denotes the size of the file in bytes in this embodiment. To generate the next pseudo-random number, apply the pseudo-random number generation technique using the seed equal to the existing value of Q. Let Q now represent the newly generated pseudo-random number.

For this particular embodiment, the encoded watermark signal information is combined with the compressed file signal information in the following manner. In the compressed file $C(F)$, insert byte $N_i$ of $E(B)$ between bytes $B_Q$ and $B_{Q+1}$ of the compressed image file $C(F)$, where i varies from 0 to m. A pixel $P(m,n)$ may be mapped into $B_P$ where $P=m*c+n$, c is the number of pixels in each row, r is the number of rows, m increases from 0 to r−1 by increments of 1, and n increases from 0 to c−1 by increments of 1. By this technique, Q may be mapped to a pixel location $B_Q$, although, of course, any one of a number of other techniques for making an assignment between numbers and pixel locations may be employed. Therefore, after inserting the first byte $N_0$ of encrypted watermark, $E(B)$, in this particular embodiment, for example, to generate the next byte location into which to insert the next byte $N_1$, apply the same pseudo-random number generation technique using the existing value of Q as the seed. This is illustrated schematically in FIG. 1.

FIG. 2 is a flowchart illustrating the previously described embodiment, although, again, this is just one example of an embodiment in accordance with the invention. The invention is not limited in scope to only implementing this particular flowchart. For example, as illustrated in FIG. 2, in block 110 the image is compressed, and in block 120, the watermark is encoded, in this embodiment, encrypted; however, the invention is not limited in scope to this order of these operations being performed. Furthermore, as previously described, the watermark may not even be encoded or encrypted. In block 130, as illustrated, the initial seed, Q, is selected, and i, a counter, is set to zero. For this embodiment, the initial seed is selected in accordance with the previously provided relationship [2], although, again, the invention is not limited in scope to this initial seed, or to using a counter, or to using a counter that begins at zero. In block 140, a pseudo-random number generation technique is applied to the initial seed, and Q is replaced with the value generated in this manner. In block 150, as previously described, the byte $N_i$ is then inserted in compressed image file C(F) between bytes $B_Q$ and $B_{Q+1}$ of C(F). For this embodiment, this process is continued until the entire encoded watermark is combined into the compressed image, although that may not be the case in alternative embodiments. An aspect of this particular embodiment, although the invention is not limited in scope in this respect, is the secure transfer of information. For example, for this embodiment, if both the sender and the receiver are familiar with the approach employed to integrate the watermark into the compressed image, then someone else intercepting the image will generally be unable to extract or recover the watermark, and, therefore, will not be able to access the information being transmitted in this fashion. Likewise, it may be possible for the receiver to tell if the image received by the receiver has been intercepted and whether tampering to the image has occurred.

For the above embodiment of a method of integrating a watermark into a compressed image, there is a corresponding embodiment of a method of recovering a watermark or encoded watermark from a compressed image in accordance with the present invention. For example, for the previously described embodiment, a corresponding embodiment for recovering a watermark or an encoded watermark from a compressed image includes: determining the locations of the groupings of bits, such as, in this embodiment bytes, in the combined compressed image-encrypted watermark file, $C_E$ (F), that correspond to the groupings of bits, here bytes, $N_i$, of the encoded watermark E(B), in this particular embodiment; extracting the bytes for the encoded watermark from those respective byte locations in file $C_E$(F); and forming the encoded watermark from the extracted pixel signal values. It is noted that, of course, the watermark extracted and formed may be a watermark subportion, and the compressed image may be a compressed image subportion. Likewise, the encoded watermark, whether or not a subportion, may be decoded and blended with the decompressed image, whether or not a subportion, if desired, such as, for example, by using a technique or approach, such as one of those described in the concurrently filed aforementioned patent application, although, as previously indicated, the invention is not limited in scope in this respect. For example, the decoded watermark may not be blended with the decompressed image at all, or they may alternatively be blended using another technique other than one of those described in the aforementioned patent application.

In this particular embodiment, due to the approach in which the bytes of E(B) have been inserted into the combined file $C_E$ (F) of the compressed image and the encoded watermark the combined file $C_E$(F) will have a size, for example, in bytes, equal to the sum of the respective sizes of C(F) and E(B), again, for this embodiment, in bytes. Therefore, the location of the particular bytes in the compressed image file may be recovered. In particular, the seed for the random process previously described above is in accordance with the following relationship [3]:

$$Q \leftarrow \lfloor \text{size}[C_E(F)]/1024 \rfloor$$

Figure 3:
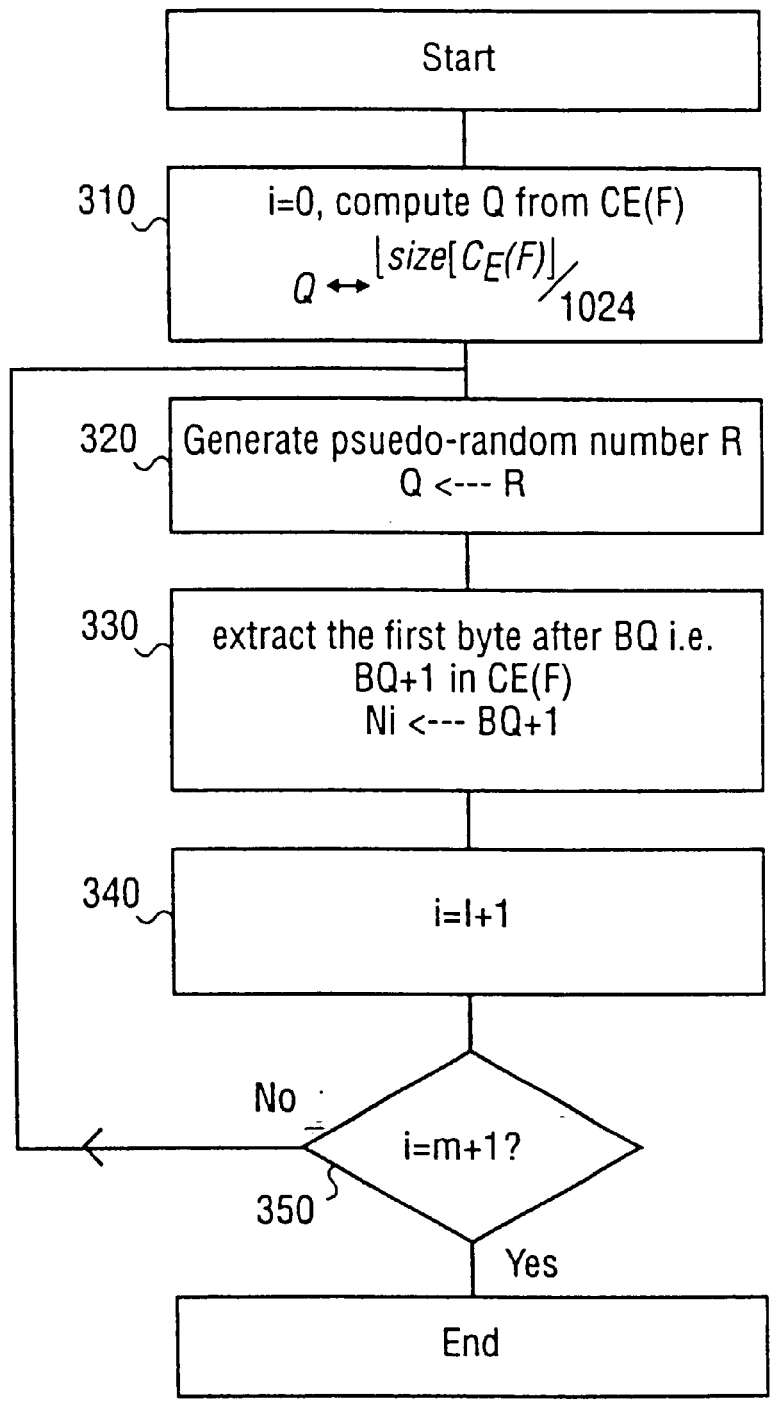
FIG. 3 is a flowchart illustrating an embodiment of a method of recovering the integrated watermark from a compressed image in accordance with the invention, specifically for recovering the watermark from a combined image made according to the embodiment of the invention illustrated in FIG. 2.

It is noted that although any pseudo-random number generation technique may be employed, the same pseudo-random number generation technique must be employed for coding and decoding for this particular embodiment. Therefore, the pseudo-random process is applied to the seed, and that number is designated Q (see blocks 310 and 320 in FIG. 3). A byte $N_i$ is located in the compressed image right after $B_Q$ in $C_E$(F) and, therefore, it may be extracted (see block 330 in FIG. 3). After all the bytes, $N_i$ of the encrypted watermark E(B) have been extracted (see blocks 340 and 350 in FIG. 3), they may be concatenated to provide E(B). This particular embodiment is illustrated by the flowchart in FIG. 3, although the invention is not limited in scope in this respect, of course.

This particular embodiment of a method of integrating a watermark into a compressed image and this embodiment of recovering an encoded watermark from a compressed image provide a number of advantages. They allow secure image data representation and secure movement of signal information, as previously described. Likewise, as previously indicated, the watermarks may be encoded and encrypted in either the image or frequency domain which provides an added level of security for these particular embodiments. An additional level of security may be obtained by encrypting the data placed in the image header, although the invention is not limited in scope in this respect. Likewise, a double level of encryption may be provided, in these particular embodiments, because, initially, the watermark pixel signal values may be encrypted, and, then, the choice of pixel locations in the compressed image at which to insert the bytes of the watermark may depend on the seed and pseudo-random number generation techniques employed. Likewise, another advantage of these particular embodiments is the relative ease, in terms of computational complexity, to extract the watermark from the image and verify authenticity. Likewise, due to the nature of this particular embodiment, it is relatively easy to remove the watermark signal information prior to compression and decompression for image transmission/recovery.

It will, of course, be understood that, although particular embodiments have just been described, the invention is not limited in scope to particular embodiments or implementation. For example, one embodiment may be implemented in hardware, whereas another embodiment may be implemented in software. Likewise, an embodiment may be implemented in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, may result in a method of upscaling a color image in accordance with the invention, such as, for example, an embodiment previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of integrating at least a portion of a watermark into at least a portion of a compressed image to generate a combined file, the method comprising:
   encoding the at least a portion of the watermark;
   compressing the at least a portion of the image; and
   combining the at least a portion of the encoded watermark and the at least a portion of the compressed image to generate the combined file, the combining of the at least a portion of the encoded watermark and the at least a portion of the compressed image comprising inserting a respective groupings of bits of the at least a portion of the compressed image, the groupings of bits being inserted at locations in the compressed image determined based, at least in part, on a size of the combined file.

2. The method of claim 1, wherein encoding the at least a watermark portion comprises encrypting the at least a watermark portion.

3. The method of claim 2, wherein combining the encrypted at least a watermark portion and the at least a compressed image portion comprises dividing the encrypted at least a watermark portion into bytes and distributing the bytes over the at least a compressed image portion.

4. The method of claim 3, wherein distributing the bytes of the encrypted at least a watermark portion over the at least a compressed image portion comprises intermittently interspersing the bytes of the at least a watermark portion between selected byte locations in the at least a compressed image portion.

5. A method of integrating a watermark into a compressed image to generate a combined file, the method comprising:
   dividing the watermark, or portion thereof, into groupings of bits;
   compressing the image, or portion thereof; and
   intermittently inserting the watermark bit groups throughout the compressed image, or portion thereof, at locations in the compressed image, or portion thereof, selected based, at least in part, on a size of the combined file.

6. The method of claim 5, wherein the groupings of bits comprise 4 bit nibbles.

7. The method of claim 5, wherein the groupings of bits comprise bytes.

8. The method of claim 7, wherein intermittently inserting the bytes of the watermark, or portion thereof, over the compressed image, or portion thereof, comprises inserting the respective bytes of the watermark, or portion thereof, between respective, selected byte locations in the compressed image, or portion thereof.

9. The method of claim 5, wherein the watermark comprises an encoded watermark.

10. The method of claim 9, wherein the encoded watermark comprises an encrypted watermark.

11. A method of recovering a watermark from a combined image file of the watermark and a compressed image, said method comprising:
    determining locations in the combined image file that include groupings of bits for the watermark, the groupings of bits being previously inserted at locations in the compressed image selected in accordance with a pseudo-random number generation technique;
    extracting the bit groupings for the watermark from the locations; and
    forming the watermark from the extracted bit groupings for the watermark.

12. The method of claim 11, wherein the watermark as formed from the extracted bit groupings is a subportion of a watermark.

13. The method of claim 11, wherein the compressed image is a compressed subportion of an image.

14. The method of claim 11, wherein the watermark is an encoded watermark.

15. The method of claim 14, and further comprising:
    decoding the encoded watermark.

16. The method of claim 11, wherein the groupings of bits comprise bytes.

17. An article comprising:
    a storage medium having stored thereon instructions to integrate a watermark, or portion thereof, into a compressed image, or portion thereof, to generate a combined file, the instructions, when executed by a machine, resulting in:
    dividing the watermark, or portion thereof, into groupings of bits;
    compressing the image, or portion thereof; and
    intermittently inserting the watermark bit groups throughout the compressed image, or portion thereof, at locations in the compressed image, or portion thereof, determined based, at least in part, on a size of the combined file.

18. The article of claim 17, wherein the instructions, when executed, further result in:
    dividing the watermark, or portion thereof, into byte sized groupings of bits.

19. The article of claim 18, wherein the instructions, when executed, result in the intermittently inserting of the bytes of the watermark, or portion thereof, over the compressed image, or portion thereof, by inserting the respective bytes of the watermark, of portion thereof, between respective, selected byte locations in the compressed image, or portion thereof.

20. An article comprising:
    a storage medium having stored thereon instructions to recovering a watermark, or portion thereof, from a combined image file of the watermark, or portion thereof, and a compressed image, or portion thereof, the instructions, when executed by a machine, resulting in:
    determining locations in the combined image file that include groupings of bits for the watermark, or portion thereof, the groupings of bits being previously inserted at locations in the compressed image, or portion thereof, determined based, at least in part, on a size of the combined image file;
    extracting the bit groupings for the watermark from the locations; and
    forming the watermark, or portion thereof, from the extracted bit groupings for the watermark.

21. The article of claim 20, wherein the instructions, when, executed, result in recovering an encoded watermark, or portion thereof, from the combined image file.

22. The article of claim 21, wherein the instructions, when executed, further result in:
    decoding the encoded watermark, or portion thereof.

* * * * *